April 1, 1969  E. M. GREER  3,436,048
SEAT ASSEMBLY FOR VEHICLES
Filed June 5, 1967
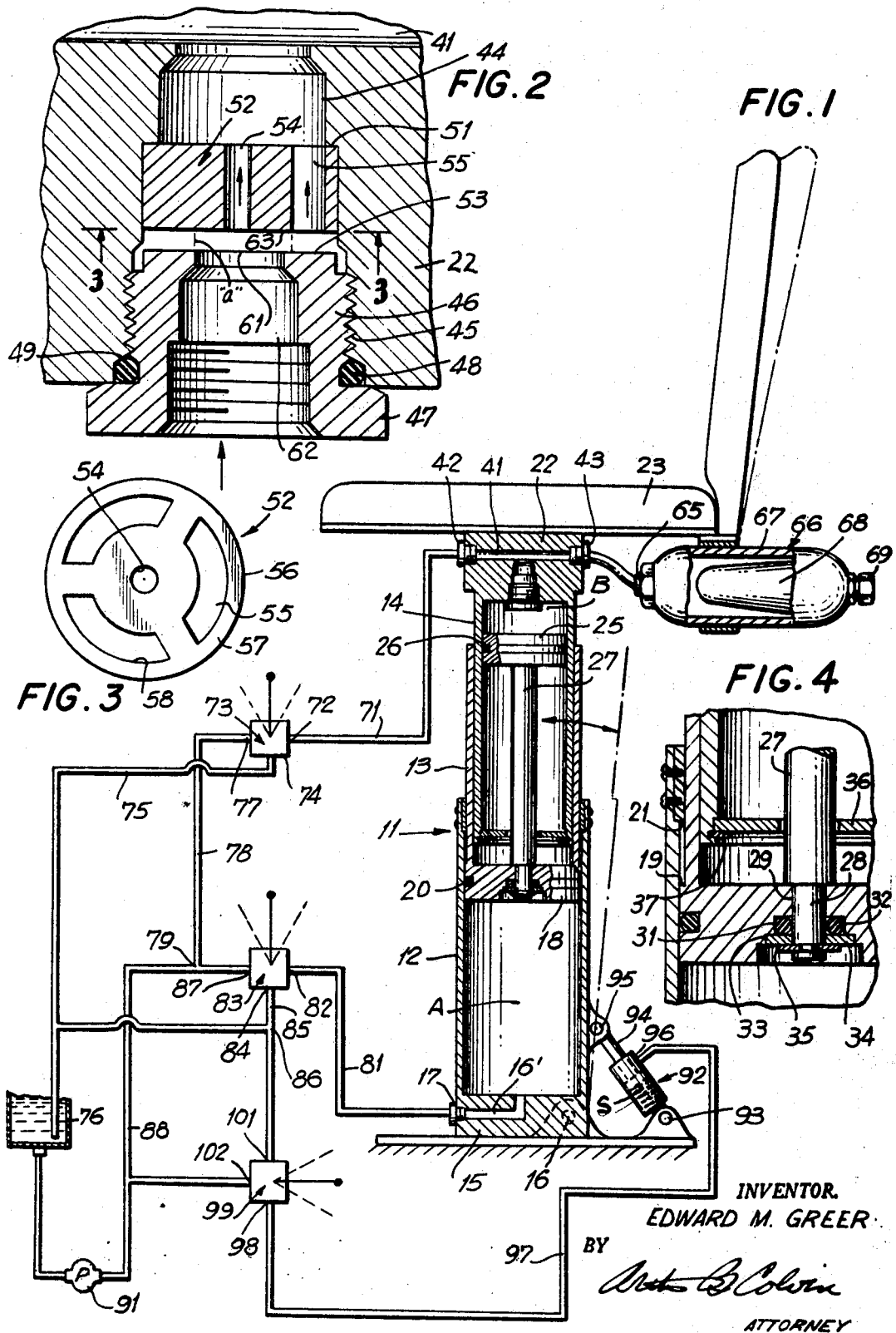
INVENTOR.
EDWARD M. GREER
BY
*Arthur B. Colvin*
ATTORNEY

United States Patent Office 3,436,048
Patented Apr. 1, 1969

3,436,048
SEAT ASSEMBLY FOR VEHICLES
Edward M. Greer, Beverly Hills, Calif., assignor to Greer Hydraulics, Inc., Los Angeles, Calif., a corporation of New York
Filed June 5, 1967, Ser. No. 643,490
Int. Cl. A47b *95/00;* A61g *15/00;* B60n *1/02*
U.S. Cl. 248—397                                     10 Claims

ABSTRACT OF THE DISCLOSURE

This invention relates to the art of seat assemblies and more particularly to a seat assembly for a vehicle designed to move over rough terrain and including adjustable yieldable means for supporting the seat and adjustable means independent of said yieldable means for varying the height of the seat.

Description of prior art

As conducive to an understanding of the invention, it is noted that vehicles such as bulldozers, tractors, earth moving equipment and the like are generally operated over rough terrain and where the driver's seat is rigidly mounted, the driver is subjected to a great deal of vibration and shock which not only causes the driver to tire rapidly, but may cause internal injuries to the driver.

Where the seat is yieldably supported by cushioning means such as spring members, rubber cushions, air filled cushions and the like, it is difficult for the driver to adjust the resiliency of such seat to meet his particular requirements. Where hydraulic means incorporating a pressure accumulator are used to cushion the seat and the force reacting against the fluid varies rapidly and over a wide range of magnitude, such as may occur when the vehicle moves rapidly over rough terrain, if the flow of fluid into and out of the accumulator is unrestricted, extreme oscillations may be provided to the seat which, in addition to giving the driver an extremely uncomfortable ride, could possibly eject the driver from the seat. Furthermore, since drivers of different heights may use the same vehicle, it is essential that ready means be available to the driver to adjust the height of the seat and if such adjustment also changes the adjustment of the resiliency of the seat, the system would require constant readjustment by the driver which would be impractical.

It is accordingly among the objects of the invention to provide a hydraulically supported seat which may readily be adjusted by the driver to change the degree of resiliency of the seat and also to adjust the height of the seat without affecting its resiliency, all with relatively simple manipulations which may readily be accomplished by the driver and which seat, although it will absorb any extreme and rapid variation of force against the seat, will not cause violent return movement of the seat after the original force has been eliminated.

Summary of the invention

According to the invention, the system comprises an actuator having a plurality of telescoped substantially vertical casings. The lowermost casing slidingly supports an intermediate casing, the lower end of which constitutes a piston slidable in said lowermost casing and defining a chamber therein. A third casing is slidably mounted in the intermediate casing and has a top wall or head on which the seat is mounted. A piston slidably mounted in the uppermost casing and defining a second or flotation chamber with respect to said casing head is rigidly connected to and spaced from the base of the intermediate casing.

The head of said third casing has a passageway therethrough in communication with a bore leading into said second chamber, said bore having associated valve means to permit relatively large flow from said second chamber into said passageway and relatively little flow from said passageway into said second chamber. The passageway is connected to a pressure accumulator and to a selector valve and the first chamber defined in the lowermost casing is also connected to a selector valve. The selector valves which are individually operated, are connected to a source of fluid under pressure and to a reservoir. In one position of the selector valves, the source of fluid under pressure may be connected to the first chamber, and to the passageway and second chamber respectively and in the second position of the selector valves the first chamber, and the passageway and the second chamber, may be connected respectively to the reservoir. In neutral position of the selector valves all of the ports thereof are closed so that there is no flow through the valves.

Thus, the height of the seat may be adjusted by controlling the amount of fluid in the first chamber and the resiliency of the seat may be adjusted by controlling the amount of fluid flowing into and out of the passageway and the second chamber and the accumulator, to charge or discharge the latter.

Brief description of the drawings

In the accompanying drawings in which is shown one of various possible embodiments of the several features of the invention, FIG. 1 is a circuit diagram of the equipment;

FIG. 2 is a fragmentary enlarged sectional view of the valve controlling flow between the accumulator and the flotation chamber;

FIG. 3 is a detail sectional view taken along line 3—3 of FIG. 2, and

FIG. 4 is a fragmentary sectional view showing the support for the piston rod of the third casing.

Referring now to the drawings, as shown in FIG. 1, the seat assembly comprises a hydraulic actuator 11, which comprises a lower cylindrical casing 12, an intermediate cylindrical casing 13 and an upper cylindrical casing 14, said three casings being telescopically interconnected.

The lower casing 12 has a base 15 which is pivotally mounted as at 16 and has a passageway 16' leading into the casing 12 with a port 17 at its outer end. The intermediate casing 13 is slidingly mounted in casing 12 and has a base 18 of slightly larger diameter than that of casing 13 so as to define an annular shoulder 19 which will abut against the internal annular shoulder 21 at the upper end of casing 12 to limit the upward movement of casing 13.

The base 18 has a peripheral annular groove in which an O ring 20 is positioned to define a seal with respect to casing 12, said base 18 defining a piston and forming the top wall of chamber A in casing 12.

The upper casing 14 is slidingly mounted in casing 13 and has a head 22 at its upper end to which a seat 23 is secured.

A piston 25 is slidingly mounted in casing 14 and has an encompassing annular O ring 26 to define a seal with respect to casing 14, said piston forming the bottom wall of chamber B in said casing 14.

The piston 25 has a piston rod 27 secured thereto which extends axially through the casing 14 and is secured to the base 18 of casing 13. To this end, the free end of the piston rod 27 is of reduced diameter as at 28 and extends through an axial bore 29 in base 18.

The bore 29 has an enlarged diameter portion 31 in which an O ring 32 is positioned to form a seal and a further enlarged diameter portion 33 to receive a washer 34 through which the portion 28 of the piston rod extends. A snap ring 35 encompassing said portion 28, releasably locks the piston rod to the base 18.

As is shown in FIGS. 1 and 4, the piston rod 27 extends through an axial opening in a plate 36, said opening being of diameter slightly larger than that of piston rod 27. The plate is secured at the lower end of casing 14 as by a snap ring 37.

The head 22 of casing 14 has a transverse passageway 41 with ports 42, 43 at each end. The head 22 also has an axial bore 44 extending between chamber B and passageway 41.

As shown in FIG. 2, the inner end 45 of bore 44 is internally threaded to receive the externally threaded end of a nipple 46. The nipple 46 has an outstanding annular flange 47 designed to abut against the surface of head 22 to limit the inward movement of the nipple. An annular groove is formed in the root end of the nipple to accommodate a seal ring 48 which will be compressed between the wall of the groove and the beveled inner surface 49 of bore 44 at the inner end thereof to define a seal when the nipple 46 is tightened.

The bore 44 has an annular shoulder 51 formed therein to serve as a stop to limit the outward movement of a valve member 52, the end 53 of the nipple 46 limiting the inward movement of said valve member 52.

As is shown in FIGS. 2 and 3, the valve member 52 is a disc of rigid material which has a central passageway 54 and a plurality of arcuate passageways 55 extending therethrough adjacent the periphery 56 of the valve member.

The passageway 54 is axially aligned with the bore 44 and the arcuate passageways 55 are aligned with the end 53 of nipple 46.

As shown in FIGS. 2 and 3, the width of annular shoulder 51 is substantially the same as the width of the portion 57 of the valve member 52 between the outer periphery 58 of arcuate passageways 55 and the outer periphery 56 of the valve member. Thus, when the portion 57 of valve member 52 abuts against shoulder 51, there will be unrestricted flow through arcuate passageways 55.

The width of the end 53 of nipple 46 is greater than that of the arcuate passageways 55 so that when the valve member 52 is seated against the end 53 of the nipple 46 the arcuate passageways 55 will be closed and there will be flow only through the central passageway 54.

As shown in FIG. 2, the total cross sectional area of the arcuate passageways 55 and central passageway 54 is slightly greater than the cross sectional area of the end 61 of the bore 62 of the nipple 46. The area provided by the annular opening $a$ between the end 53 of nipple 46 and the undersurface 63 of valve member 52, when it is seated on shoulder 51, together with the area of central passageway 54 is also slightly greater than the area of the inner end 61 of bore 62.

As a result of the foregoing, it is apparent that when the valve member 52 is seated on shoulder 51 there will be substantially unrestricted flow of fluid from chamber B through the bore 44 and when the valve member 52 is seated on the end 53 of the nipple 46, the sole flow into chamber B will be through the central passageway 54.

The actuator 11 is illustratively utilized in the hydraulic circuit shown in FIG. 1. Thus, the port 43 is connected to the fluid port 65 of a pressure accumulator 66 of conventional type which may be for example of the type shown in U.S. Patent No. 3,232,318.

Such accumulator illustratively comprises a rigid container 67 with a deformable bladder 68 therein which may be charged with gas under pressure through valve 69.

The port 42 of head 22 is connected by line 71 to the port 72 of a selector valve 73, the latter having a return port 74 connected by line 75 to reservoir 76 and a port 77 connected by line 78 to junction 79.

The port 17 of casing 12 is connected by line 81 to port 82 of sector valve 83, the latter having a return port 84 connected by line 85 to junction 86 and thence to reservoir 76. The valve 83 also has a port 87 connected to junction 79 which is connected by line 88 to one side of a pump 91, the other side of which is connected to reservoir 76.

Associated with the casing 12 is a hydraulic actuator 92 pivotally connected at one end as at 93 to a fixed support and having its piston rod 94 pivotally connected as at 95 to the casing 12. The actuator which illustratively is of the spring return type, has a port 96 connected by line 97 to port 98 of selector valve 99. The valve 99 has a port 101 connected to junction 86 and a port 102 connected to pressure line 88.

The selector valves 73, 83 and 99 are of the type that in the neutral position will have all ports closed; in one operating position ports 72, 74; 82, 84 and 98, 101 of valves 73, 83, 99 will be connected, and in another operating position ports 72, 77; 82, 87 and 98, 102 of valves 73, 83, 99 will be connected.

In the operation of the system, assuming that it is incorporated into a tractor, the chamber B of the actuator 11 and the accumulator 66 are charged with oil under pressure. This is accomplished by setting the selector valve 73 to connect its ports 77 and 72. As a result, fluid under pressure will flow from pump 91, through ports 77, 72 into passageway 41 of head 22 of casing 14. The fluid will thence flow into port 65 of the accumulator 66 to compress the gas in the bladder 68 therein and charge said accumulator and will also flow into bore 44 of head 22.

Fluid flowing into bore 44 will react against the top surface of the valve member 52 moving the latter downwardly against end 53 of nipple 46 so that the arcuate openings 55 will be closed and hence there will only be relatively restricted flow through central passageway 54 into the chamber B.

Assuming, at this time, that the base 18 of casing 13 is bottomed against base 15 of casing 12, as the piston 25 defining the floor of chamber B cannot move downwardly due to its connection through rod 27 to the base 18, the casing 14 will rise due to the pressure buildup in chamber B. The valve 73 is then closed, to close all of its ports and the chamber B will be charged with fluid under pressure determined by the pressure of the compressed gas in bladder 68 of the accumulator 66.

Thereupon, the driver will sit on the seat 23. Due to his weight, which tends to force the casing 14 downwardly to increase the pressure in chamber B, and assuming that the force created by the driver's weight causes the pressure in chamber B to exceed that in accumulator 66, fluid will be forced from chamber B upwardly through the bore 44 of head 22 into the accumulator 66. As a result of such upward movement of the fluid in bore 44, the valve member 55 will be quickly moved upwardly to abut against the shoulder 51 so that relatively large flow will be permitted through the now opened arcuate passageways 55 and the central bore 54. Since at this time, as illustratively described, the base 18 of casing 13 is bottomed against the base 15 of casing 12, the seat of the driver may not be at the desired height. It is now merely necessary for the driver to adjust selector valve 83 to connect its ports 87, 82.

As a result, fluid under pressure will flow from pump 91, through ports 87, 82 of selector valve 83 into chamber A of casing 12 to react against the base or piston 18 of casing 13 to lift said casing. As the weight of the driver reacting against the fluid in chamber B has already been stabilized as previously described, the upward movement of casing 13 will cause simultaneous upward movement of casing 14 due to the fact that the piston 25 which forms the floor of chamber B is rigidly connected through rod 27 to the base 18 of casing 13.

When the seat is at the desired height, the driver need merely move the selector valve 83 to neutral position which will close all of its ports. Since there is no path for the fluid to escape from chamber A, the fluid in such chamber will constitute substantially a rigid member so that the piston 18 will remain in its set position and the seat will consequently remain in the desired position.

The driver can adjust the seat so that its resiliency or flotation effect satisfies his requirements.

Under shock load conditions, such as when the tractor is moving rapidly over a very rough or bumpy terrain, the weight of the driver may be effectively increased 1½ to 2 times. This would tend to force the casing 14 downwardly and if there was unrestricted flow through the bore 44 in both directions into and out of the accumulator 66, the accumulator would quickly charge, and discharge as soon as the vehicle moved away from the bump that caused the effective increase in the driver's weight. This would result in rapid flow out of and into the chamber B so that harmonics would result and cause the driver to bounce up and down with resultant discomfort to the driver and possible dislodgment of the driver from his seat.

By reason of the flow control valve 52 in bore 44, this problem is eliminated.

Thus, with a sudden effective increase of the driver's weight against the seat 23, there will be sudden increase of pressure on the fluid in chamber B caused by the reaction of the inner surface of head 22 against such fluid. Consequently, referring to FIGS. 1 and 2, the valve member 52 will be lifted rapidly against the abutment shoulder 51 so that there will be a large flow of fluid from chamber B through the open arcuate passageways 55 and central passageway 54 into the accumulator 66, permitting rapid downward movement of casing 14. This will charge the accumulator and further compress the gas in bladder 68 and cushion any shock to the driver resulting from such rapid downward movement of seat 23.

As soon as such effective increase in the driver's weight is eliminated, which would reduce the force exerted against the fluid in chamber B and hence the pressure in such chamber, due to the previous additional compression of the gas in the accumulator, the fluid under pressure therein will then flow out of the accumulator back into bore 44 of head 22. However, as a result of the flow of fluid against the valve member 52, the latter will quickly be moved downwardly against end 53 of nipple 46 thereby closing the arcuate passageways 55 so that only relatively restricted flow will be provided through the central passageway 54 into the chamber B. As a result of this restricted flow, the chamber B will charge relatively slowly with consequent relatively slow lifting of casing 14 and the driver's seat 23 so that no bouncing effect will be created.

With the system above described, it is apparent that the height of the seat can be changed without in any way modifying the cushioning effect provided by the accumulator 66. Thus, to raise the seat it is merely necessary for the driver to actuate selector valve 83, to connect its ports 87, 82 to the pump 91. To lower the seat it is merely necessary for the driver to actuate the selector valve, to connect its ports 82, 84 to the reservoir 76. As the result of the latter connection, due to the weight of the driver on the seat, the pressure on the fluid in chamber A will force such fluid through port 17, ports 82, 84 into the reservoir 76. Since the chamber A is isolated from the chamber B and the accumulator 66, adjustment of the height of the seat will have no effect on the charge of the accumulator 66. When the selector valve 83 is in neutral position all of its ports are closed and the column of fluid in chamber A will constitute substantially a rigid member that will retain the casing 13 in fixed position and only the casing 14 will be resiliently supported by reason of the interconnection between the fluid in chamber B and the accumulator 66.

If the driver wishes to change the resiliency of the seat 23, he need merely adjust selector valve 73. Thus, if he wishes a "harder" or less resilient seat, the driver need merely connect ports 77 and 72 of the selector valve 73 so that fluid under pressure will be forced into chamber B and the accumulator 66 to further compress the gas in the latter. With greater pressure in the accumulator 66, the resistance offered by the latter to downward movement of the seat 11 will of course be enhanced, thereby providing a harder or less resilient effect. To make the seat more resilient, the driver need merely connect ports 72, 74 of the selector valve 73 which will permit discharge of fluid under pressure from the accumulator into the reservoir 76 thereby reducing the pressure in the accumulator so that a more resilient effect will be provided.

Although changes in the amount of fluid forced into the accumulator 66 will also change the height of the seat slightly, the seat height can then be reset by the driver by merely adjusting the selector valve 83.

The equipment above described also permits the driver to change the angle of the seat. This is readily accomplished by actuation of selector valve 99. Thus, when ports 98, 102 of the selector valve are connected, fluid under pressure will flow into actuator 92 to retract the piston thereof and cause the actuator 11 to move in a clockwise direction. When the selector valve 99 is closed, the seat 23 will consequently be locked in desired position. The spring S associated with the actuator 92 is of sufficient strength to prevent movement of the piston by reason of the weight of the driver on the seat, even when such weight is effectively increased by the force caused by movement of the tractor over a bump or the like.

By reason of the fact that the casings of the actuator 11 are nested, they provide sufficient structure to take care of all fore and aft loads as well as side loads. It is therefore unnecessary to utilize additional supporting structure such as pantograph or scissor type linkage supports to support the weight.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A seat support system comprising a hydraulic actuator adapted to be mounted in substantially upright position, said actuator having a movable member having a seat secured to its upper end, said movable member having a flotation chamber associated therewith, a fluid pressure accumulator connected to said flotation chamber, means selectively to vary the pressure of the fluid in said pressure accumulator and said flotation chamber to adjust the resiliency of said seat, and hydraulically controlled means selectively to adjust the position of said movable member to vary the height of said seat without affecting the pressure of the fluid in said pressure accumulator and said flotation chamber.

2. The combination set forth in claim 1 in which said actuator comprises a cylindrical casing defining the base of said actuator, a piston member slidably mounted in said casing and defining a first chamber therein, said movable member comprising a second casing having a head portion on which said seat is mounted, said second casing having a piston member slidably mounted therein and defining said flotation chamber therein with respect to said head portion, means rigidly connecting said two piston members in longitudinally spaced relation, said flotation chamber having a passage means leading there-into to which said pressure accumulator is connected and independent selector valve means to provide flow of fluid under pressure into and out of said two chambers.

3. The combination set forth in claim 2 in which said passage means and said first chamber each has a fluid port, a source of fluid under pressure, a pair of selector valves each having a pair of pressure ports and a return port, one of said pressure ports of each selector valve being connected to an associated fluid port, each selector valve having a neutral position in which all of its ports are closed and two operating positions, both of the pressure ports being connected in one of said operating positions and the return port and the pressure port connected to an associated fluid port, being connected in the other operating position.

4. The combination set forth in claim 2 in which means in said passage means provides relatively large flow through said passage means from said flotation chamber and relatively small flow into said flotation chamber through said passage means.

5. The combination set forth in claim 4 in which said passage means comprises an axial bore in said head portion having its inner end in communication with said flotation chamber, said accumulator being in communication with the outer end of said bore, and the means to provide relatively large flow from said flotation chamber through said passage means and small flow through said passage means into said flotation chamber, comprises a valve member slidably mounted in said bore and movable between an innermost and outermost position, said valve member having a passageway therethrough, means closing said passageway only when said valve member is in its innermost position, and an additional passageway in said valve member providing constant communication therethrough, said additional passageway having a smaller cross sectional area than that of said first passageway.

6. The combination set forth in claim 5 in which said valve member is a relatively thick disc of rigid material, said first passageway comprises a plurality of openings through said disc adjacent the periphery thereof and said additional passageway comprises a central bore through said disc, said axial bore in said head portion having an internal annular shoulder against which the periphery of the outer surface of the disc outwardly of said plurality of openings abuts to restrict outward movement of said disc, said axial bore also having an inner abutment longitudinally spaced from said shoulder, against which the inner surface of said disc abuts to restrict inward movement of said disc and close said plurality of openings, said inner abutment having an axial passageway aligned with said central bore in said disc and in communication with said flotation chamber.

7. The combination set forth in claim 2 in which said casing head portion has a transverse passageway therethrough and an axial bore extending from said flotation chamber into said transverse passageway, said passageway and said bore comprising said passage means, said pressure accumulator having an oil port connected to one end of said transverse passageway, said axial bore having a valve member slidably mounted therein and movable between an innermost and outermost position, said valve member having a first passageway therethrough, means closing said first passageway only when said valve member is in its innermost position and an additional passageway in said valve member providing constant communication therethrough, said additional passageway having a smaller cross sectional area than that of said first passageway.

8. The combination set forth in claim 1 in which said actuator comprises a first cylindrical casing having a base, an intermediate cylindrical casing slidably mounted in said first casing, said intermediate casing having a base defining a piston in said first casing, said piston defining a chamber in said first casing with respect to the base thereof, said movable member comprising a third cylindrical casing slidably mounted in said intermediate casing, said third casing having a head portion at its upper end, a piston slidably mounted in said third casing and defining a flotation chamber therein with respect to said head portion, said piston being rigidly connected to the base of said intermediate casing and longitudinally spaced therefrom, said head portion having passage means therein leading into said flotation chamber, a pressure accumulator having an oil port connected to said passage means, a seat secured to said head portion and means independently to connect a source of fluid under pressure to said passage means and to the chamber in said first casing.

9. The combination set forth in claim 8 in which means are provided pivotally to mount the first casing adjacent its lower end, and means to pivot said first casing about its pivotal mount.

10. The combination set forth in claim 9 in which the means to pivot said first casing comprises a hydraulic actuator having a piston therein, a piston rod connected at one end to said piston and to its other end to said first casing, said actuator being of the spring return type and having a port associated with said piston, a selector valve having a return port and two pressure ports, means connecting one of the pressure ports of said selector valve to the port of said actuator, said selector valve being of the type which in neutral position will have all of its ports closed and having two operating positions, in one of said operating positions, said two pressure ports are connected and in the second operating position, the pressure port connected to the port of said hydraulic actuator is connected to the return port of said selector valve.

References Cited

UNITED STATES PATENTS

| 2,383,173 | 8/1945 | Watter | 248—393 |
| 2,880,782 | 4/1959 | Conner | 248—399 |
| 2,923,344 | 2/1960 | La Voie et al. | 248—404 |
| 3,150,855 | 9/1964 | Carter et al. | 248—400 |
| 3,168,278 | 2/1965 | Ogden | 248—400 |
| 3,198,474 | 8/1965 | Doll | 248—399 |
| 3,265,345 | 8/1966 | Vuichard | 248—400 |
| 3,288,454 | 11/1966 | Decker et al. | 297—347 |

FRANCIS K. ZUGEL, *Primary Examiner.*

U.S. Cl. X.R.

248—400, 404; 297—347